United States Patent [19]

Jensen

[11] Patent Number: 4,895,556
[45] Date of Patent: Jan. 23, 1990

[54] SEALING ELEMENT FOR ANGLE SEALS AND T-SHIRT BAGS

[75] Inventor: Harold A. Jensen, Brockton, Mass.

[73] Assignee: Katana Corp., Somerville, Mass.

[21] Appl. No.: 184,077

[22] Filed: Apr. 15, 1988

Related U.S. Application Data

[63] Continuation-in-part of Ser. No. 34,898, Apr. 3, 1987, abandoned.

[51] Int. Cl.$^4$ .................... B31B 1/64; B31B 35/64
[52] U.S. Cl. .................................... 493/209; 493/206; 156/583.1
[58] Field of Search ............... 493/189, 193, 206, 207, 493/209, 394, 470; 156/583.1

[56] References Cited

U.S. PATENT DOCUMENTS 2,982,334  5/1961  Cooper et al. ................. 100/93 RP
3,853,664  12/1974  LaFleur ............................. 156/308.4

Primary Examiner—James G. Smith
Assistant Examiner—William E. Terrell
Attorney, Agent, or Firm—Samuels, Gauthier, Stevens & Kehoe

[57] ABSTRACT

Seals are formed in bags made from a flexible web. The sealing element is a heated wire. The thermal conductivity of the wire is selected in reference to the melt and tack characteristics of the film being sealed such that when the film is placed in heat-exchange relationship with the wire, the film is sealed. Futher, at least a portion of the film travels on the sealing element. The resistance across the sealing element remains constant during sealing and while the web travels sequentially.

7 Claims, 9 Drawing Sheets

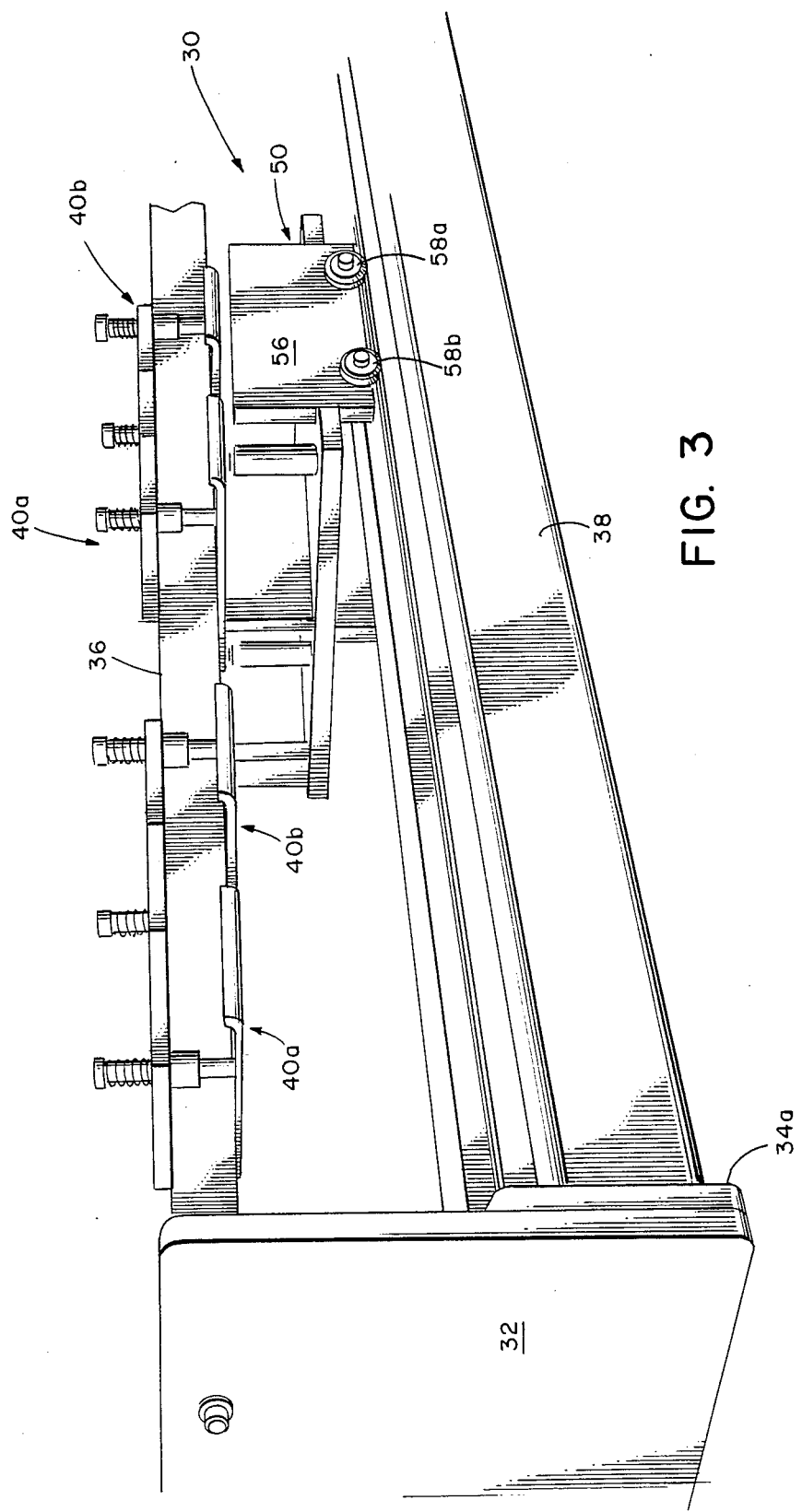

SEALING ELEMENT FOR ANGLE SEALS AND T-SHIRT BAGS

CROSS REFERENCE TO RELATED APPLICATION

This application is a continuation-in-part of Ser. No. 034,898 filed Apr. 3, 1987 now abandoned.

BACKGROUND AND SUMMARY OF THE INVENTION

In the sealing of flexible film to form packages, such as bags, sealing machines are used which machines are typically hydraulically actuated presses. Heated elements such as a knife edge or a bar having a flat surface are driven into engagement with the film to cut or seal the film. It is not unusual when forming bags from continuous tubular film for a press to have both a knife and a flat bar, to seal and at the same time, cut the film.

One type of seal commonly made with flexible side-gussetted packaging is an angle seal. The seal is formed at a 45° or 90° angle to the longitudinal axis of the travelling film. The 45° type of seal allows a bag to be formed with a 'square bottom'. The press generally comprises a plate which is received between the opposed facing surfaces of the side gussett(s) (plies). Spaced apart from the outer surfaces of the film are hydraulically actuated plates carrying the sealing bars which bars are in register with one another. In timed sequence the plates close toward one another, the bars contact the film forming an angle seal in each side of the gussett; that is, sealing the two plies on each side.

There are other different types of angle sealers but they all rely upon massive apparatus which requires substantial energy to operate, which energy is independent of the energy needed to heat the sealing bars to seal the film. The prior art is believed to be best represented by LaFleur, U.S. Pat. No. 3,853,664; Kan, U.S. Pat. No. 4,055,109; Smith, II, U.S. Pat. No. 4,261,253; Hummel et al, U.S. Pat. No. 4,526,565; French, U.S. Pat. No. 4,555,293; Zurn, U.S. Pat. No. 4,649,259; Johnson, U.S. Pat. No. 4,692,135; and Netherlands Patent No. 7800-295.

My invention comprises an apparatus and method for forming seals in multi-ply flexible film. The invention uses substantially less energy than prior art sealers and is considerably less expensive than prior art sealers. The sealer embodies a heated wire to effect the seals. The current though the wire is preferably maintained at a constant rate. The temperature is such that the film may travel on the wire without the film becoming tacky. When the seal is made substantially all the thermal energy (heat) in the wire is transferred to the film to effect the seal(s). Further, when the seal is made, the film generally envelops the wire; i.e. the contacting plies each surrounding the wire about 180°. After a seal(s) has been effected, the film continues on its travel until the next seal is to be made. The current through the wire remains substantially constant. The timing of the formation of the successive seals and the control of the current through the wire is such that the wire is sufficiently heated to effect the successive seals formed in the film.

The structure of the sealer is such that it may be easily incorporated on existing converting apparatus for single or multiple, side-by-side runs. The hydraulic lines and massive structure of the prior art apparatus are unnecessary.

My invention, in one embodiment, will be described in reference to its use for forming angle seals in continuous tubular film which film is sealed and cut to form blocksealed, side-gussetted, square bottom bags having an aperature on only one side thereof as disclosed in my copending application Ser. No. 942,605 filed Dec. 17, 1986 which application is hereby incorporated by reference in its entirety in this application. However, my invention also finds application for sealing multiple films generally as will be described.

My invention, in another embodiment, will be described in reference to its use for forming seals on the handles of tubular, bottom and top welded T-shirt bags, and further my invention includes such bags.

My invention, in still another embodiment, will be described in reference to forming bottom and/or top transverse sides in tubular films and particularly in reference to form two such seals in two separate films simultaneously.

Broadly my invention comprises a hot wire which defines the dimension and shape of the seal to be formed in the plies of a flexible film. A sealing shoe is disposed adjacent the surfaces to be sealed. An electromagnet is disposed on the opposite side of the hot wire. This forms a shoe-wire-electromagnetic array. The plies of the film to be sealed travel between the shoe-wire and between the wire-electromagnet.

The shoe-wire-electromagnet are adapted for relative motion one to the other to effect sealing between the plies of the film. In the prior art the sealing knives, bars, etcetera either disengage the sealing knife from the film after the seal has been made and while the film continues its travel or reduce the current to the sealing bar or both. This is to ensure that the film does not 'stick' during its travel. The wire of my invention has a constant current applied to it. The heat transfer characteristics are such that when the seal is made substantially all the heat is transfered to the film being sealed. After the sea has been made the film continues its travel, a portion of the film still contacting the sealing element. When the next seal is made the sealing element has reached the correct temperature to effect the seal in combination with the sealing shoe.

With the apparatus and method of my invention a low cost, low energy sealing is provided at least for the reason that the film may travel on the heated wire at all times and when the seal is formed basically all the heat is transferred from the wire to the film. Thus, the structure and costs associated with disengaging the film from a heated element and/or impulse heating are eliminated and additional energy beyond that necessary to form the seal is not needed.

In the preferred embodiment, a hollow wire is used to form angle seals. The wire is disposed between the plies of a side-gussetted film. The sealing shoe and electromagnet are disposed on the outer sides of the film. The electromagnet is fixed, the wire is biased slightly upward, with reference to horizontal, and the electromagnet is fixed.

The thermal energy required for the seal will vary depending upon the latent heat in the wire, the force exerted by the sealing shoe in its clamping position, the duration of the clamping and the thermoplastic properties of the film.

BRIEF DESCRIPTION OF THE DRAWINGS

FIG. 3 is a fragmentary perspective view of a sealer embodying the invention for forming angle seals in sidegussetted film;

BRIEF DESCRIPTION OF THE PREFERRED EMBODIMENT(S)

The invention will be described in one embodiment in reference to the incorporation of the invention in a converter which converter forms block-sealed, side-gussetted, bottom-weld, square-bottom bags. The invention forms the angle seals which results in the square bottom. The techniques for forming the bags per se from continuous film are well known in the art and need not be described in detail.

Figure 1:
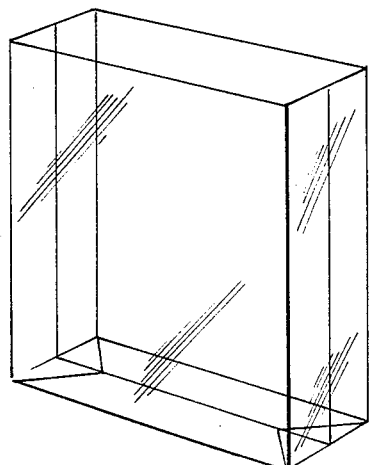
FIG. 1 is a perspective view of a square-bottom, side-gussetted bag produced by the apparatus and method of the invention.
Figure 2:
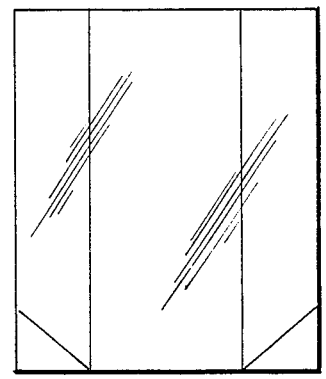
FIG. 2 is a front view of the bag of FIG. 1.

Referring to FIGS. 1 and 2, a bag which has been removed from a block of sealed bags is the product of the preferred embodiment The sealer is shown generally at 30 in FIG. 3. The sealer is fixedly secured to a state-of-the-art converter 32. The sealer comprises two sealing shoe assemblies 40a and 40b including two sealing shoes and a sealing assembly 50. The sealing assembly comprises a housing and two wire assemblies 80a and 80b.

A T-track 36 is secured to the sides of the converter and a cross member 38 is secured to plates 34a and 34b; and the plates, in turn, are secured to the sides of the converter. Typically, multiple sealers 30 will be used. In FIG. 3, only one sealer 30 is fully shown.

Figure 5:
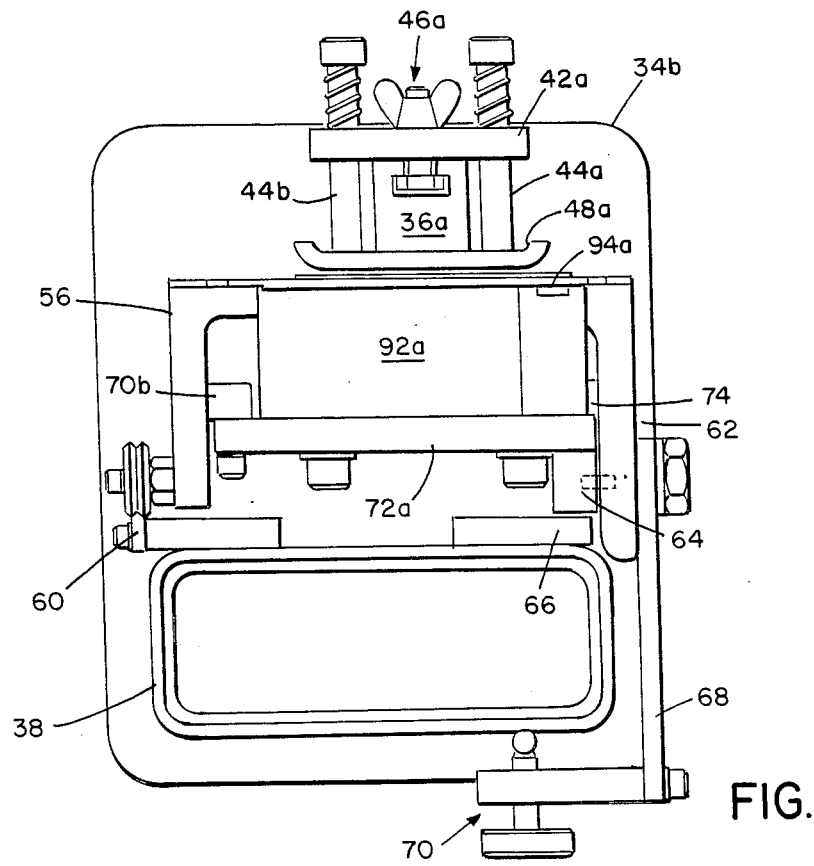
FIG. 5 is an end view of FIG. 4.

Referring to FIGS. 3 and 5, the sealing shoe assemblies are shown in greater detail. The assemblies 40a and 40b being identical, only one will be described in detail. The sealing shoe assembly 40a is carried on the track 36. A shoe slide 42a is disposed below the T-track. Two spring loaded shafts 44c and 44d pass through the shoe slide and are fastened to the track 36 by a wing nut screw assembly 46a. Received on the depending ends of the shafts 44c and 44d is a sealing shoe 48a. The spring loaded shafts bias the shoe 48a upwardly. The sealing shoe assembly 40a may be adjusted transversely to the direction of travel of the film by the wing nut screw assembly 46a.

Figure 4:
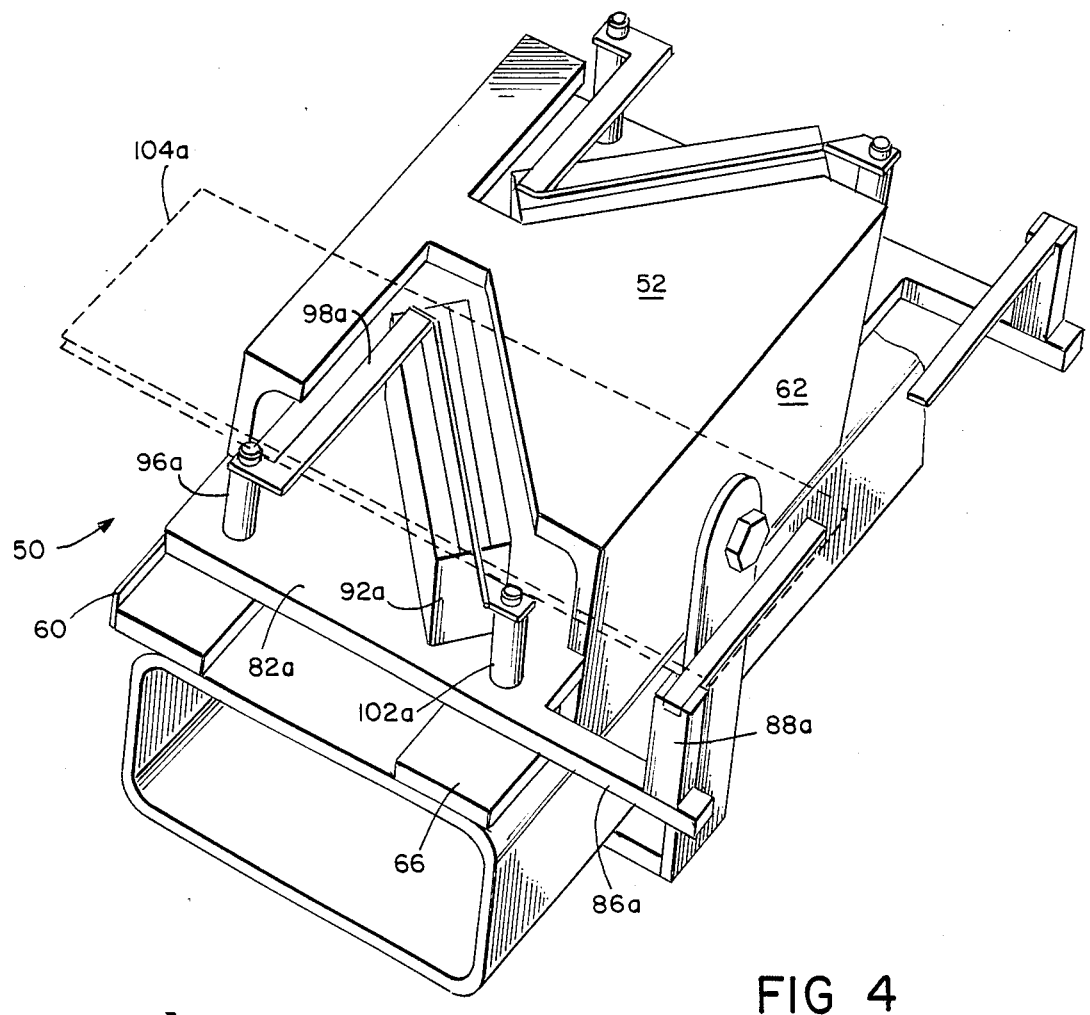
FIG. 4 is a perspective view of the sealer.
Figure 6:
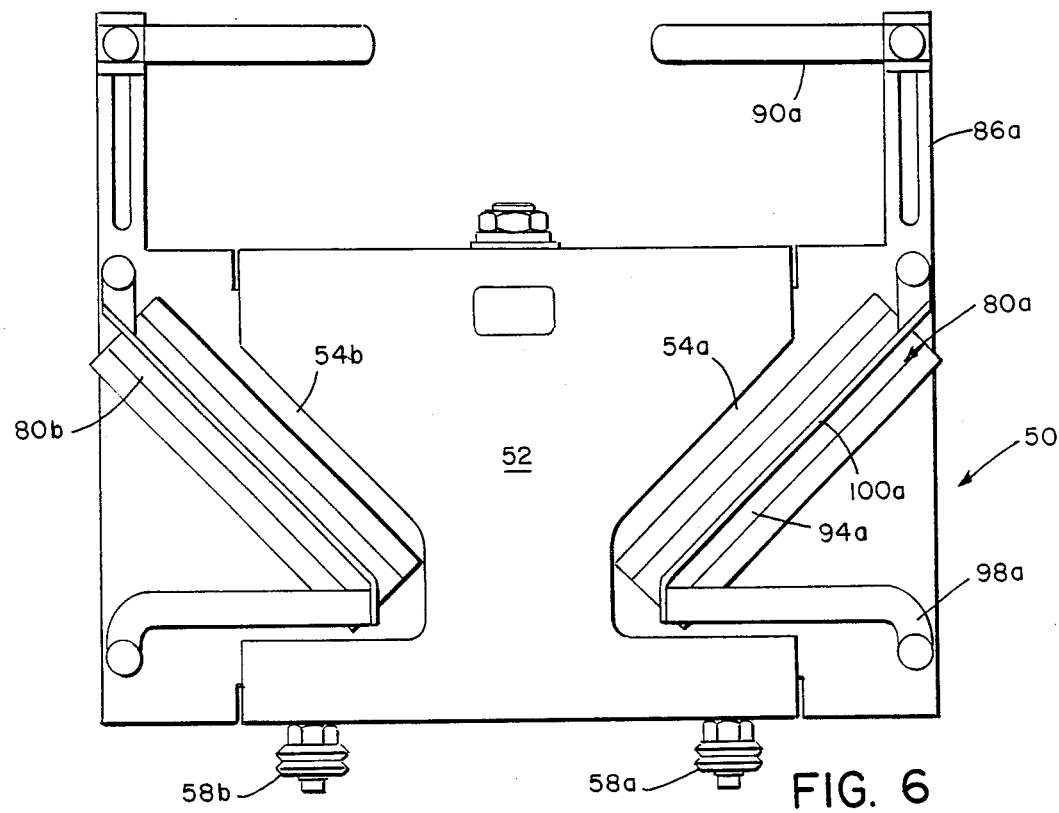
FIG. 6 is a plan view of FIG. 4; .

Referring to FIGS. 4, 5 and 6, the sealing assembly 50 comprises a housing which supports two wire assemblies. The housing comprises an upper plate 52 characterized by two substantially U shaped openings 54a and 54b. Depending from one side of the plate 52 is a wall 56 having two wheels 58a and 58b journaled thereto. These wheels engage a track 60 of the cross member 38. Depending from the other side of the plate 52 is a wall 62, a bearing 64 journalled to the inner surface of the wall 62, which rides on a bearing surface 66 of the cross member 38. Joined to the outer surface of the wall 62 is an L-shaped clamp bracket 68 which passes under the cross member 38. A clamping screw 70 engages the underside of the cross member 38. Extending inwardly from the opposed facing surfaces of the walls 56 and 62 are elongated rectangular support members 70a and 70b. The support members include pairs of spaced tapped holes whereby the two wire assemblies may be adjustably secured.

Figure 8:
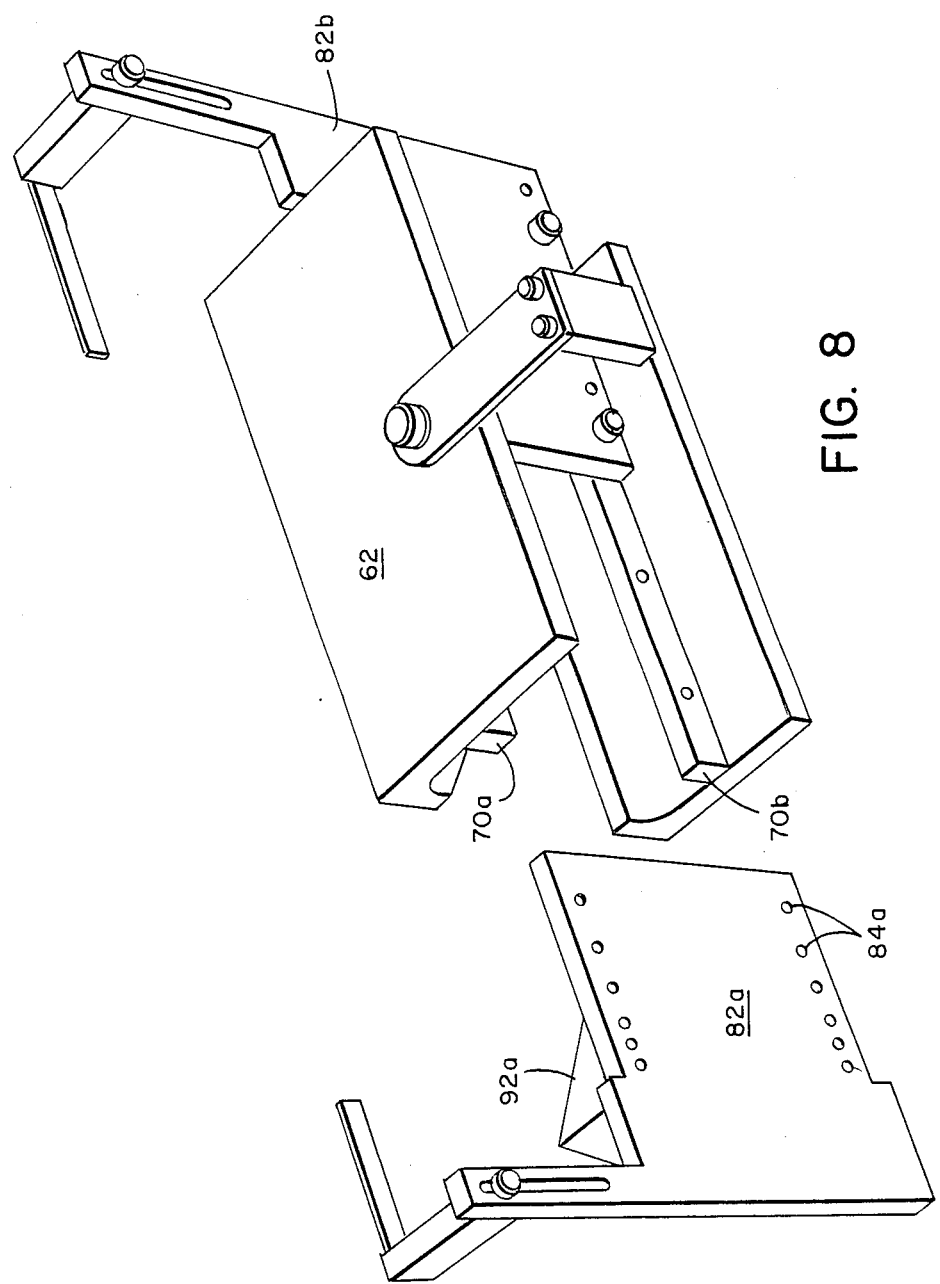
FIG. 8 is an exploded bottom perspective view of the sealer of FIGS. 4–7.

The wire assemblies 80a and 80b are mirror image identical and only one will be described in detail. The assembly 80a comprises a base plate 82a which includes pairs of tapped holes 84a by which the plate 82a is secured to the members 70a and 70b. This adjustable feature is shown in FIG. 8. The plate is further characterized by an extended slotted arm 86a to which is secured a post 88a and extending planar finger 90a. Fastened to the plate 82a is an electromagnet 92a, its upper surface having an elongated rubber strip 94a received therein. The upper surface of the magnet lies in substantially the same plane as the upper surface of the plate 52. A post 96a is joined to the plate 82a and extends upwardly therefrom. To the post is fastened a planar electrode 98a which is joined to a hollow, stainless steel wire 100a at one end. At the other end this electrode 98a is biased upwardly. The other end of the hollow, stainless steel wire 100a is joined to a post 102a. The wire 100a is in register with the resiliant surface 94a of the magnet 92a. The wire 100a and electrode 98a lie in a plane spaced above the plane of the upper surface of the plate 52.

Referring to FIG. 4, a thin sleeve of teflon 104a (shown in dotted lines) overlies the upper surface of the plate 54 and the upper surface of the electromagnet 92a. This sleeve of teflon is engaged to the flat finger 90a and lies on both sides of the electrode 98a and stainless steel wire 100a. This improves the longevity of the wire and upper surface of the electromagnet and also enhances movement of the film. The post 88a is adjustable whereby the sleeve may be moved when wear patterns appear.

As shown in FIG. 8, the plates 82a and 82b, and thereby the electromagnets and wires they support, are adjustable laterally to accommodate films of different widths. The sealing shoe assemblies 40a and 40b are also adjustable on the T-bar 36 whereby registration of the shoes with the wires is ensured.

Wires are connected to the posts 96a and 102a and 96b and 102b and to a power source. The electromagnets 92a and 92b are also suitably connected to a power source. These power connections are schematically shown in FIG. 9.

Figure 9:
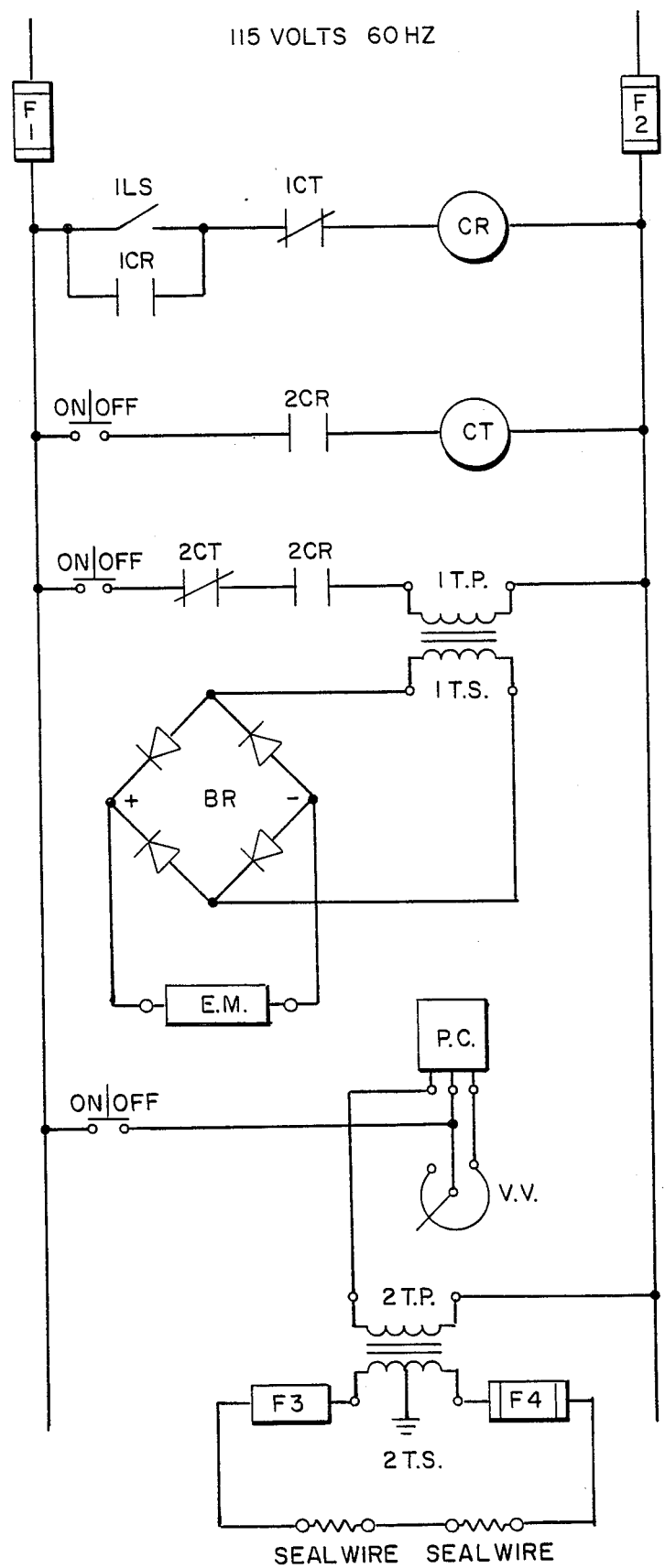
FIG. 9 is a schematic of the circuit for the sealer of FIG. 3.

In FIG. 9, the limit switch LS receives a signal from the converter which basically is when the film has been temporarily stopped for sealing and cutter operations. The associated control relays CR's and control timers CT's energize and deenergize the electromagnets 92a and 92b. This sequence occurs before the next signal from the converter which corresponds to the film stopping for the next cuting and sealing operation. The ON/OFF switches are manual and during normal operations are all on the ON position.

In the formation of film in a converter, usually a single flattened film is slit to form parallel flattened tubular films. The film edges are sealed when slit as is well known. There may be, for example, four flat tubular films moving through the converter side by side. The films are stopped in timed sequence. When the films is stopped, it is when apertures, bottom welds etcetera and the seals of the invention are formed.

In the use of the apparatus and operation of the process, the T bar 36 and cross member 38 are bolted or otherwise secured to the sides 32 of a converter, usually just upstream of the location where the bottom welds are formed. The sealing shoe assemblies are placed on the T-bar 36. The sealing assemblies 50 are secured on the cross member 38.

Figure 7:
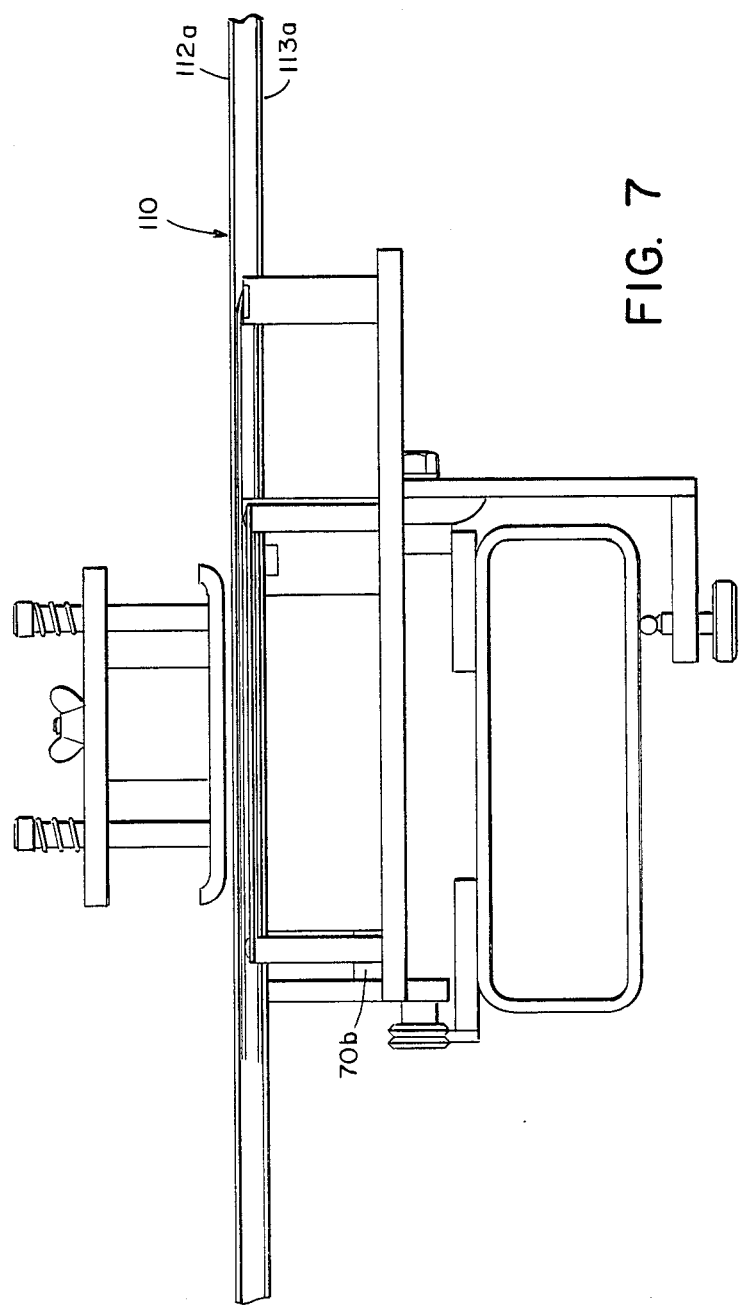
FIG. 7 is a side illustration of the sealer with side-gussetted film.

Referring to FIG. 7, flattened tubular side-gussetted film 110 overlays the plate 52 The following description is for sealing one side of the film, the sealing of the other side being identical The upper ply 112a is supported on the film 104a and travels over the guide finger 90a, wire 100a, electrode 98a and under the sealing shoe 48a. The lower ply 114a travels under the film 104a, the guide finger 90a, wire 100a, electrode 98a and over the upper surface of the plate 52 upper surface of the electromagnet 92a.

The wire 100a is a hollow, stainless steel wire 3½" in length, the film is HDPE one (1) mil thick the current passing through the wire is 12 amps, the source of power 1-4 volts. The current remains unchanged during formation of the bags. The voltage applied to each electromagnet 92a is 24 volts which draws the sealing shoe into clamping position. The timing of the actuation of the electromagnets is synchronized with the other sealing and cutting operation of the converter.

When the film stops, the electromagnet 92a is energized and the plate 48a is drawn downwardly bringing the plies 112a and 114a into contacting sealing engagement with the wire 101a. The wire 101a being resiliant is also carried downwardly, its motion stopped by the electromagnet 92a. While the plate 48a, plies 112a and 114a, wire 100a and electromagnet 92a are in this clamped position, thermal energy is transferred to the plies forming the angle seals in the plies. Substantially, all the thermal energy or heat is transferred. The seals are shown in FIG. 2. The electromagnetic 48a is deenergized and is moved to its upwardly based position and the film continues on its travel. No change is made to the current applied to the element. Although the ply will travel across the element 101a as the film 110 is moved, the film will not become tacky.

The invention has been described with reference to a specific film, heated wire and method of assembly for a square-bottom, side-gussetted, bottom-sealed bag. The element may be at any angle with reference to the longitudinal axis of the bags being formed from 0° to 180°.

Figure 10:
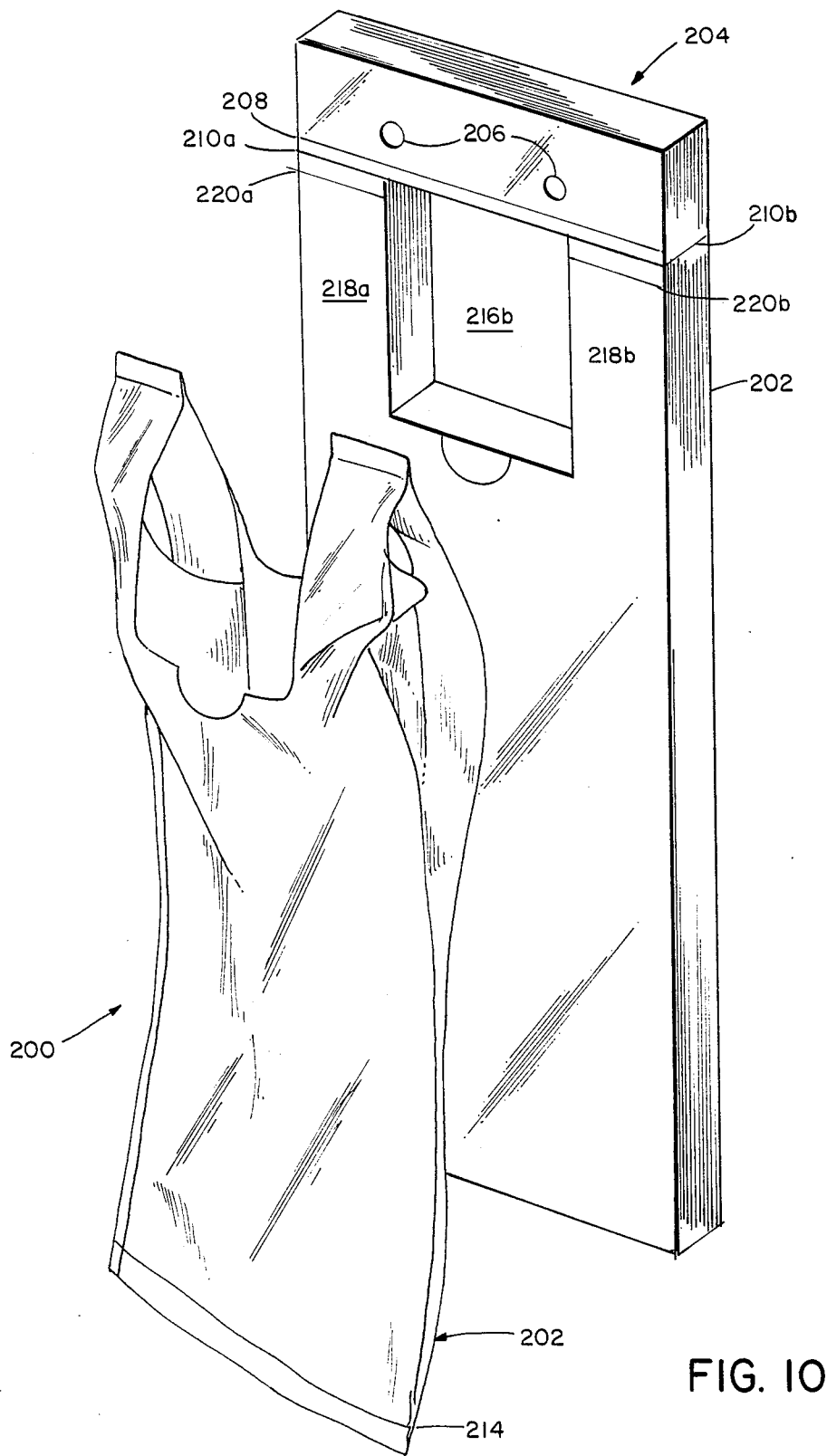
FIG. 10 is a perspective view of a T-shirt bag.

Referring to FIG. 10, in another embodiment of the invention, a block-sealed T-shirt bag is shown at 200 and comprises bags 202. Each bag is joined to a punched hanger 204, which hanger is characterized by holes 206 and a seal line 208. Spaced apart from the seal line are release lines 210a and 210b.

Releasably joined to the hanger 204 at the release lines are the bags 202. The bags have a crescent shaped opening 212 formed in the outer facing side thereof, according to the teachings of my prior invention, and a bottom seal 214. A rectangular shaped opening 216 is formed by a die thus defining hanger straps 218a and 218b. Seal lines 220a and 220b are formed in the top portions of the straps 218a and 218b.

The seal lines 108, the holes 206, the release lines 210a and 210b, and rectangular opening 212 are formed by steps each of which is known in the prior art. The transverse seals 220a and 220b are formed according to the inventive device and process disclosed herein. Thus, in this embodiment there is provided a easily releasable T-shirt bag which heretofor has not been available in the prior art in the configuration described.

Figure 11:
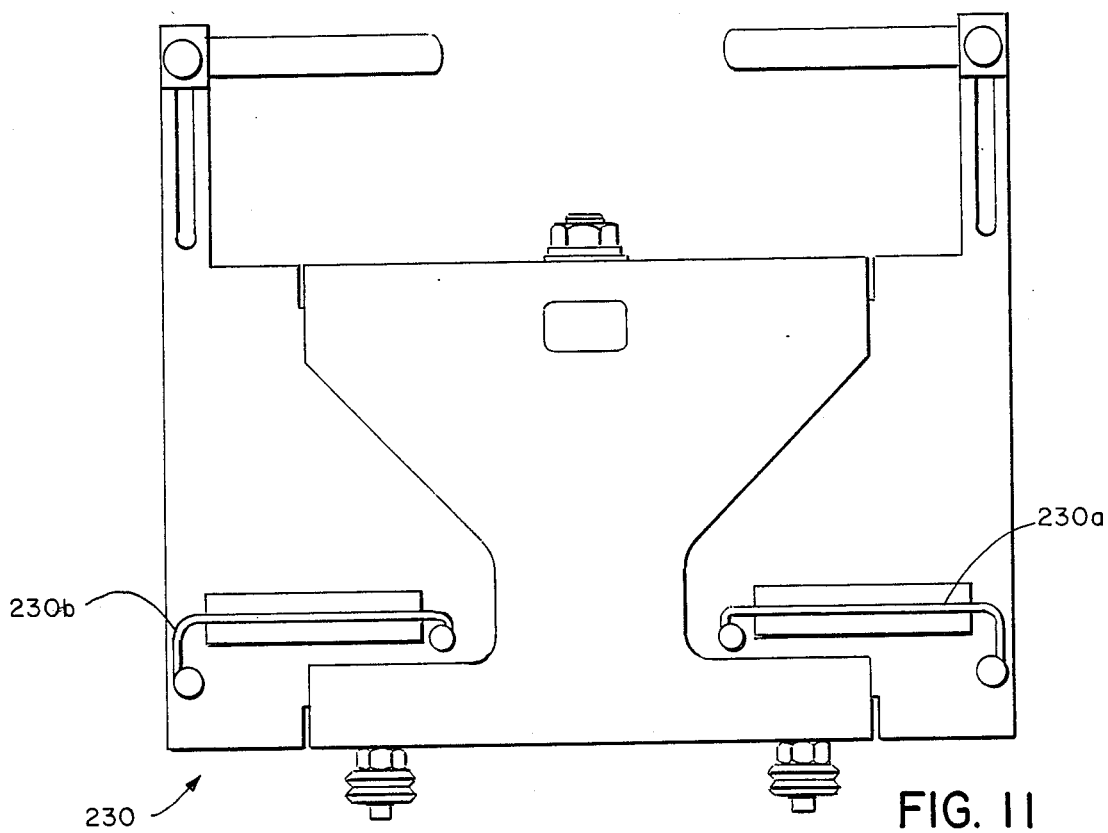
FIG. 11 is a plan view of a sealer for the T-shirt bag.

FIG. 11 illustrates a sealer 230 which is used to form the seals 220a and 220b. This sealer is the same as the sealer of FIGS. 2-8 except the hot wires 230a and 230b are at right angles to the direction of travel of the film and the sealing shoes and electromagnet are reset accordingly.

Figure 12:
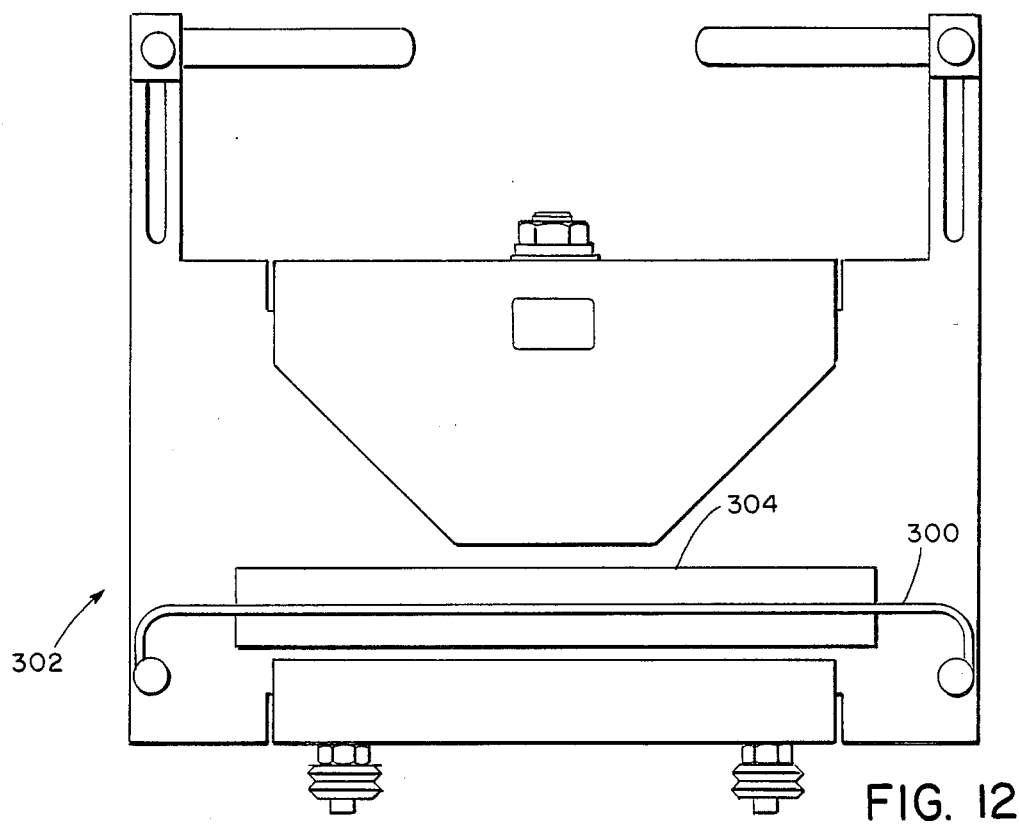
FIG. 12 is a plan view of a sealer for a transverse seal.
Figure 13:
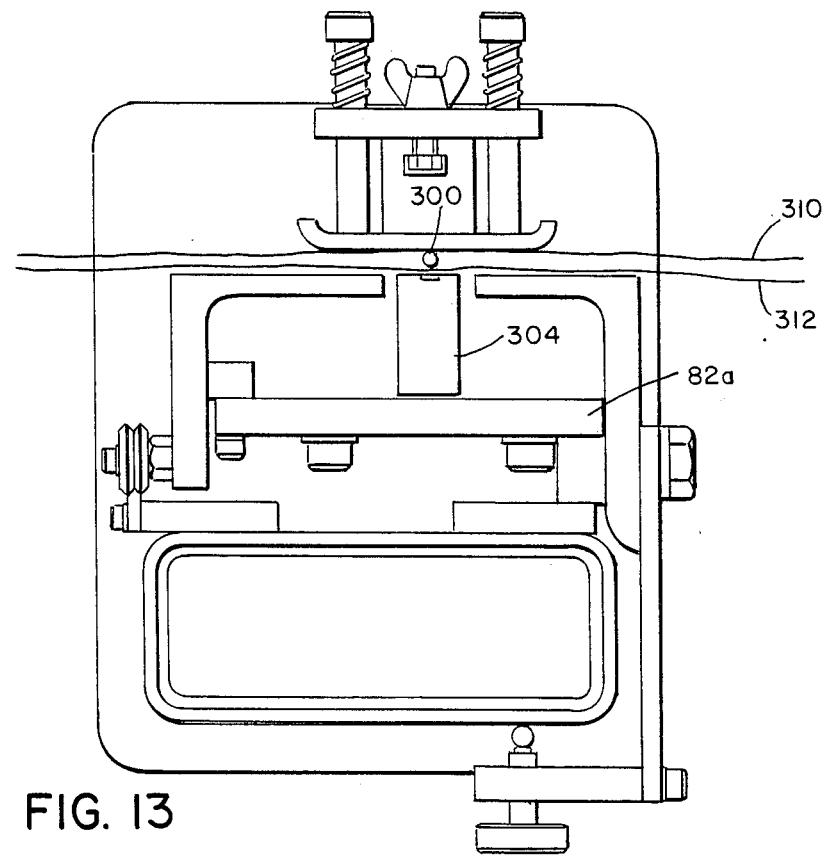
FIG. 13 is a side view of the sealer of FIG. 12.

Referring to FIGS. 12 and 13, in still another embodiment of the invention, the sealer of FIGS. 2-8 has been modified by extending a hot wire 300 from one to the other side of a sealer 302. The neck portion of the plate 52 is removed to form an opening 304. An electromagnet 306 and a sealing shoe 308 extend across and are in register with the hot wire 300. The plate 82a and 82b are simply batted together to support the electromagnet 306.

As shown in FIG. 13, two flattened films 310 and 312, they may or may not be tubular and/or they may or may not be side-gussetted, travel between the shoe 308 and wire 300 and the wire 300 and the electromagnet 304 respectively. The electrode post supporting the wire is not shown for clarity. This embodiment allows two welds or seals to be formed simultaneously in two separate films with an intermediate hot wire.

Having described my invention, what I now claim is:

1. An angular gussett sealer for use with a converter which converter seals, slits and otherwise forms side-by-side side-gussetted tubular webs, which comprises:
    a track adapted to be secured to the converter to extend thereacross, in a direction substantially transverse to the longitudinal axis of the moving webs;
    a pair of sealing shoes secured to the track, each of the shoes biased to an open position;
    means to position the shoes on the track in a direction transverse to the longitudinal axis of the webs;
    a crossmember adapted to be secured to the converter to extend thereacross, the crossmember parallel to and spaced apart from the track;
    a sealing assembly secured to the crossmember for adjustment relative thereto, the assembly having:
    a pair of electromagnets secured to the assembly in a moveable manner;
    a pair of sealing wires secured to the assembly in a moveable manner between the sealing shoes and the electromagnets;
    the pairs of shoes, sealing wires and electromagnets being in register with one another;
    means to heat the sealing wires; and
    means to energize the electromagnets to move the shoes from their biased open position to a closed position with the electromagnets, whereby gussetts lying between the sealing wires and the shoes and lying between the sealing wires and the electromagnets are sealed.

2. The apparatus of claim 1 wherein the sealing shoes are spring biased.

3. The apparatus of claim 1 which includes guide means spaced apart from and upstream of the sealing elements and lying in the same plane as the sealing elements to guide the web toward the elements.

4. The apparatus of claim 3 wherein the guide means and sealing wires are contained in a sleeve.

5. The apparatus of claim 1 wherein the sealing wires are at an acute angle with reference to the longitudinal axis of the moving web.

6. The apparatus of claim 1 wherein the sealing wires are at 45° angles to the longitudinal axis of the web.

7. The apparatus of claim 1 wherein the sealing wires are at 90° angles to the longitudinal axis of the web.

* * * * *